Feb. 6, 1962 G. R. WHITTENBERG 3,019,571
WORK SUPPORTING BRACKETS FOR CENTERLESS GRINDERS
Filed Oct. 15, 1959 3 Sheets-Sheet 1
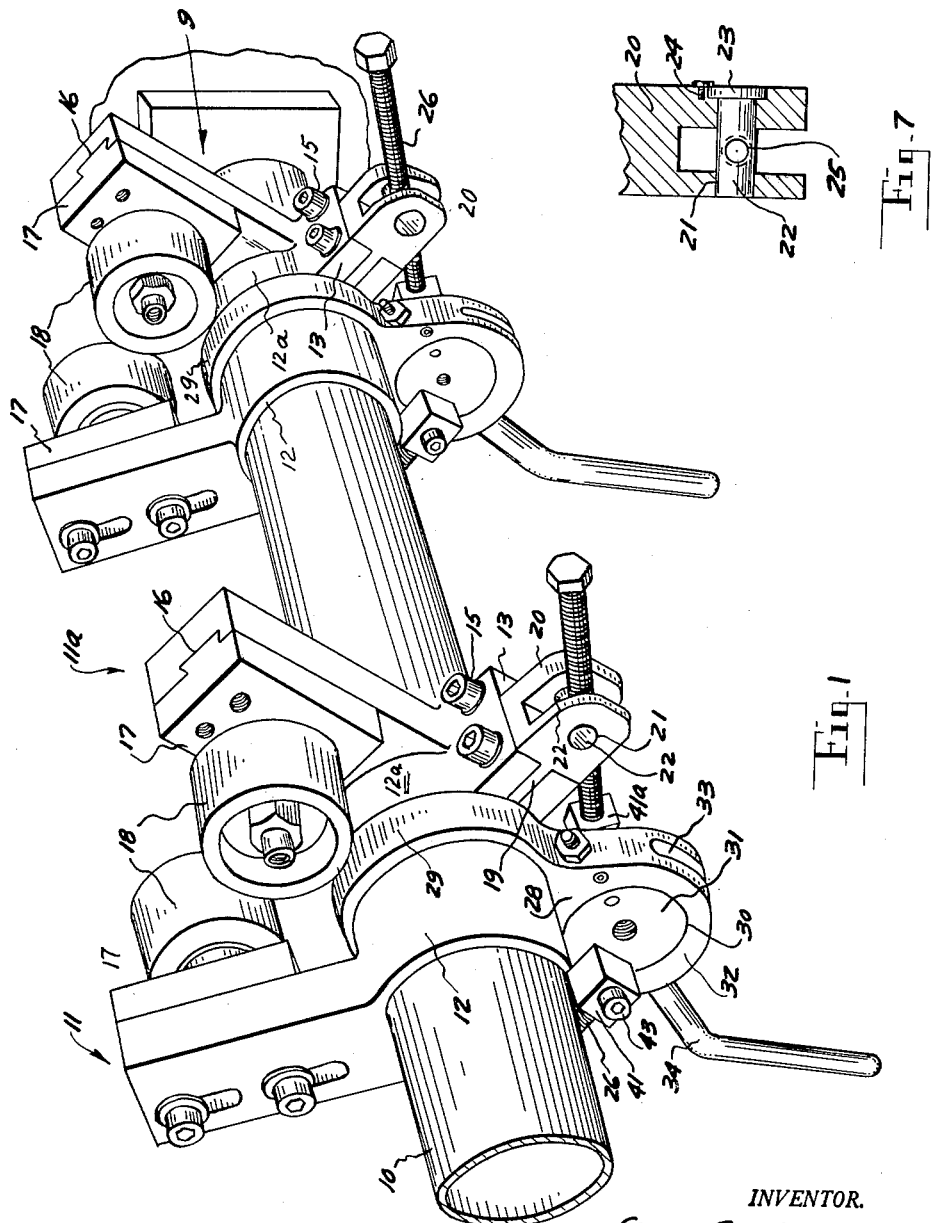
INVENTOR.
GEORGE R. WHITTENBERG
BY Louis Chayka
ATTORNEY

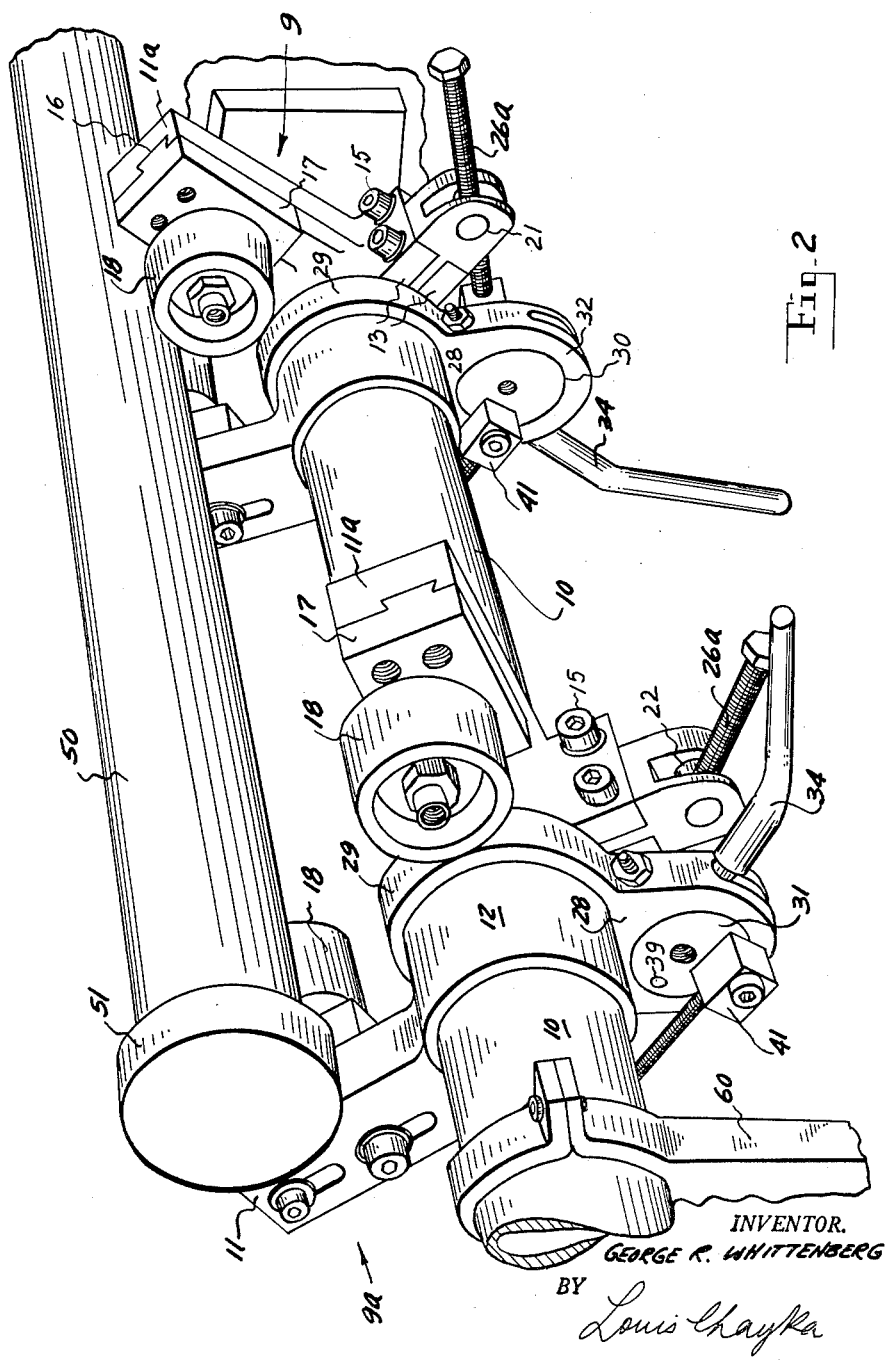

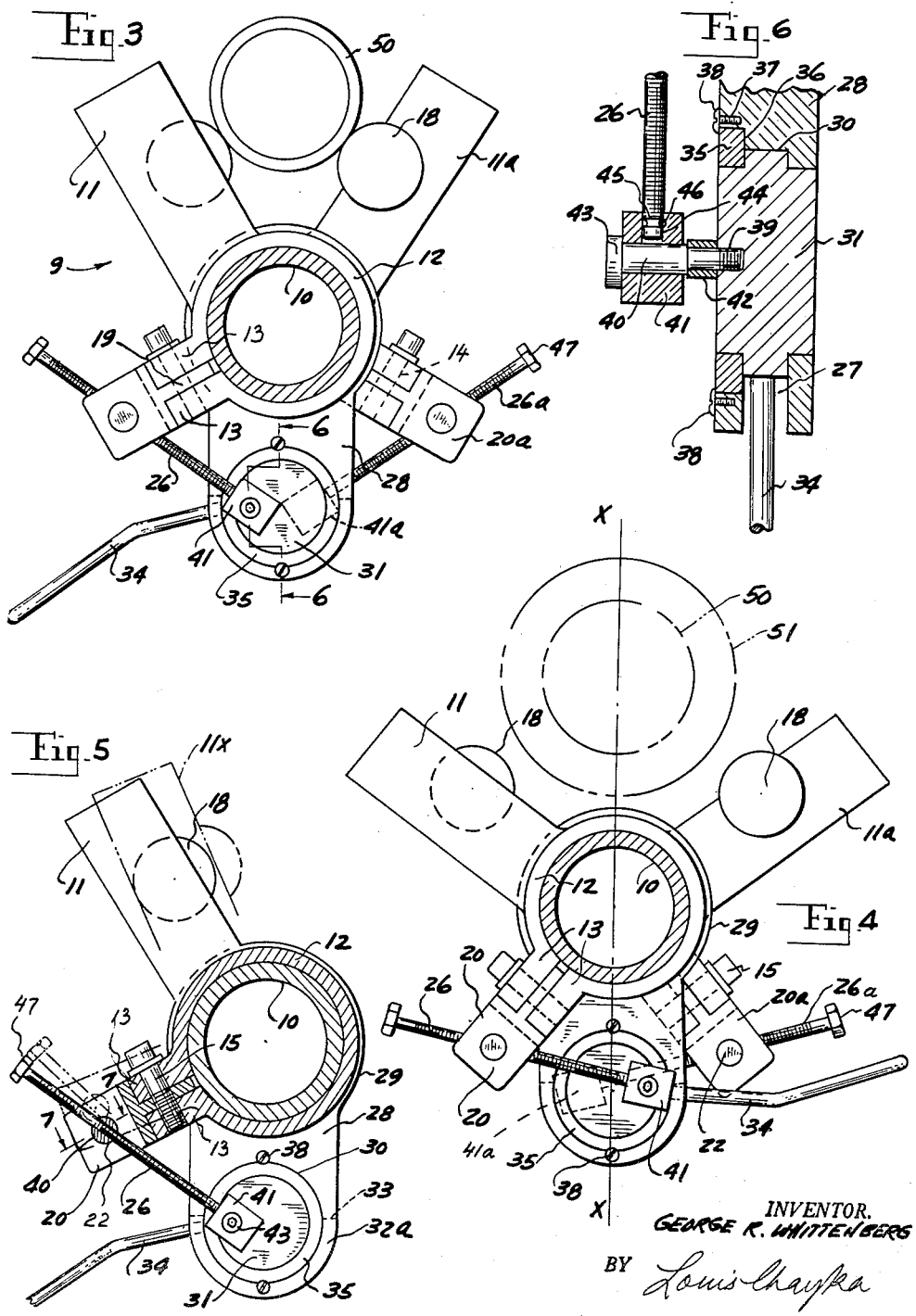

United States Patent Office 3,019,571
Patented Feb. 6, 1962

3,019,571
WORK SUPPORTING BRACKETS FOR CENTERLESS GRINDERS
George R. Whittenberg, 8301 Lynch Road, Detroit 34, Mich.
Filed Oct. 15, 1959, Ser. No. 846,613
6 Claims. (Cl. 51—236)

The invention pertains to work-supporting means consisting of a framework including a horizontally-disposed beam and a plurality of brackets mounted upon said beam. Each of the brackets includes two arms in a V-shaped arrangement, each of said arms having mounted thereon a roller for support of the work piece to be ground. The arms are mounted on the beam in such a manner that the angle of divergence of said arms from each other may be adjusted with reference to the diameter of the object supported by said arms. While suitable means for this purpose are already known, they are of a type requiring considerable time for such an adjustment.

Once such an adjustment has been made, the brackets will be fully serviceable as long as the diameter of the object to be ground is uniform throughout its length. Where a difficulty arises is when the object to be ground includes a portion of a diameter in excess of the diameter of the main portion of said object. A bracket set at an angle which is satisfactory with respect to the diameter of the main length of the object will not permit passage of the radially-expanded portion of the object. What must be done in such cases is to stop the operation of the grinder, adjust the position of the arms of the bracket so as to permit the axial movement of the object till the portion of excessive diameter has passed over the arms of said bracket, then stop the operation of the machine once more, and bring the arms of the bracket to their original position with respect to each other.

As the object to be ground is ordinarily supported by a number of brackets mounted on the same beam in a spaced relation to each other, each of said brackets would require this double adjustment, which, naturally, would take considerable time and effort.

To eliminate the above disadvantages and to secure a condition under which the object to be worked upon may be carried in a continuous axial movement in spite of the diversity of its diametrical dimensions at different portions of its length, I have devised a mechanism to be described herein.

The mechanism is such that first the arms adapted to carry a work piece may be adjusted to the diameter of the main portion thereof, but includes means responsive to the action of a hand-operated handle whereby the arms of a bracket may be instantly spread apart to accommodate the portion of the work piece of excessive diameter, without interfering with the continuous axial movement of said work piece.

I shall now describe my improvement with respect to the accompanying drawings in which:

FIG. 1 is a perspective view of two work-supporting brackets, each bracket consisting of two roller-equipped arms in a V-shaped arrangement for support of a work piece to be carried towards the grinder, each bracket including means for adjustment of the angular positions of its arms towards each other;

FIG. 2 shows the same brackets, the view including a length of a tubular object supported by the arms of one bracket, while the arms of the adjoining bracket are spread apart to permit passage of one end portion of said object, which portion is of a diameter in excess of the diameter of the main portion of the object;

FIG. 3 is an end view of the arms of one bracket, the view including a mounting for said arms and the means for adjustment of the angular spread therebetween;

FIG. 4 is the end view of the elements shown in FIG. 3, but disclosing the arms spread apart to an angle in excess of that shown in FIG. 3;

FIG. 5 is a fragmentary end view of a work-supporting bracket, a part of the bracket being shown in section;

FIG. 6 is a sectional view on line 6—6 of FIG. 3;

FIG. 7 is a sectional view on line 7—7 of FIG. 5.

Similar numerals refer to similar parts throughout the several views.

The drawing in FIG. 1 shows a tubular member 10 which at times will be referred to as a beam, and which is ordinarily supported by vertical standards 60. A part of one such standard is shown in the drawings. Said member 10 supports a plurality of brackets, generally identified by numeral 9, each of the brackets including two arms identified by numerals 11 and 11a, respectively. As one arm includes the same component parts as the other, a description of one will apply to the other, but for the sake of clearness, elements of one arm or connected to one arm may be identified by numerals with a letter "a," while the corresponding elements pertaining to the other arm may be identified by the same numerals but without said letter "a."

Starting with the arm 11, it will be noted that it projects from a sleeve 12 which embraces said tubular member 10. The sleeve is slit radially to form two opposed ends, and includes a tongue 13 projecting radially from one said end and a similar tongue projecting radially from the other said end, the tongues being in a spaced but substantially parallel position with respect to each other, as best shown in FIGS. 3 and 5. Each of the tongues contains a pair of transverse bores 14 to which I shall refer again.

Mounted upon each arm in a longitudinal slideway 16 is a block 17, and carried by said block is a roller 18 for a tangential contact and support of a work piece to be propelled axially towards the grinder. As the means pertaining to the rollers and their mounting are well known, and are no part of the invention described herein, no further details thereof are deemed necessary.

Fitting between the tongues 13 and clamped therein by bolts 15 passing through said bores 14 is the shank 19 of a fork 20. Pivotally secured within the fork in two opposed bearings 21 is a short transverse pin 22, best shown in FIGS. 2 and 5. The pin is made with a radially-expanded head 23, shown in FIG. 7. A small screw 24, threaded from outside into the fork 20 parallel to said pin 22, bears against said head 23 and serves as a means of preventing axial displacement thereof from said bearing 21. The pin contains a diametrical bore 25 which is threaded for engagement with a link 26.

It will be noted that the sleeve 12a which supports the arm 11a is in axial alinement with said sleeve 12, but that there is a space left between said two sleeves. Secured to said member 10, between said sleeves, by means of an integrally-formed ring 29, is a thick, flat member 28 which extends downwardly from said member 10 and is provided with a circular opening 30. Fitting into said opening is a disk 31 adapted to be rotated about a horizontal axis disposed in a vertical plane with the axis of said beam. The marginal portion 32 of the member 28, defining an arc of approximately 180 degrees below the horizontal diameter of the aperture 30, contains a slot 33, the slot opening radially outwardly from said disk from one end of the arc to the other. Radially secured to the disk and extending outwardly through said slot is a handle 34.

FIG. 6 discloses means for retention of the disk 31 within said opening 30, the means consisting of a ring 35 fitted concentrically into an annular recess 36 in the side surface of said member 28, the ring overlapping the marginal portion of the disk 31. Screws 37 are threaded into said member 28, each screw having a radially-expanded head 38 bearing from outside against said ring to hold it in place.

The disk 31 is provided with two transverse bores 39, each of which is threaded, one of the bores opening into the body of the disk from one side, the other opening from the other side. Each bore is located close to the perimeter of the disk at the same distance from the center, but one is located to one side of the center and the other bore to the other side of said center.

Threaded into each bore is a pin 40, best shown in FIG. 6, and pivotally mounted thereon is a block 41. Seated on the pin between the block and the disk is a short spacer 42, while a radially-expanded head 42 of the pin bears against the block from each other side. The block contains a circular socket 44 bored radially with respect to said pin 40 for reception of one end of the link 26. The link is provided at said end with an annular groove 45 for engagement with a ball 46, this being a part of a well-known structure to allow rotation of the link about its axis without permitting axial movement thereof. A similar block, marked 41a, is similarly mounted on the opposite side of the disk on a bolt threaded into aperture 39, said block having a socket for connection to the link 26a. The latter is connected to the sleeve 12a by intermediate means which are analogous to those for connection of block 41 with the sleeve 12. Each of the links is provided at the end remote from the disk with an angular head 47 for application of a wrench or a similar tool.

I shall now describe the manner of operation of my improved bracket:

Assuming that a tubular or cylindrical object such as the work piece 50 shown in FIG. 2 is to be worked upon by a centerless grinder, the work piece has to be supported by said V-shaped brackets in its horizontal position parallel to the beam 10. More specifically, the work piece has to be laid between the arms 11 and 11a of each of the brackets so as to be supported by rollers 18. Normally said rollers are in contact with the work piece at a level below the axis of the work piece, but will hold said piece out of contact with the beam 10. As different work pieces to be supported by said brackets may be of different diameters, it is first necessary to adjust the arms 11 and 11a to the best angle for support of the respective work piece. This is effected by means of the threaded links 26 and 26a, as will be explained with reference to the drawings in FIG. 5. As shown there, link 26 is threaded through the pin 40 in the fork 20, while the lower end of the link is held against axial movement in the socket 44 of the block 41 which is mounted on the disk 31.

To effect the adjustment of the position of the arm 11 from the position shown in solid lines to the position shown in dotted lines 11x, it is first necessary to hold the disk against rotation. This may be done by means of the handle 34 which is to be held in a stationary position. Thereupon, the link 26 is turned about its axis clockwise, which may be done by means of a socket wrench applied to the head 47 of said link. As a result thereof, the sleeve 12 is swivelled clockwise about the beam 10, carrying the arm 11 to said new position 11x. Obviously, the opposite arm 11a of the bracket has to be adjusted similarly to its new position.

In cases where the work piece is of uniform diameter throughout its length, no further adjustment of the arms of the brackets is necessary. However, in cases where the work piece includes a portion or portions, such as portion 51 in FIG. 2, the diameter of which is larger than the diameter of the main portion of the work piece, it becomes necessary to spread the arms of the bracket or brackets to permit axial movement of the work piece therebetween. While this could be done by means of said links in the manner described above, the operation would be too slow, calling for temporary stoppage of the grinding operation upon said work piece. It is in such cases that the adjustment for the spreading of the arms of the bracket may be effected promptly, without interruption of said grinding operation and without stopping the axial movement of the work piece.

As the supporting means for support of the work piece include a number of said V-shaped brackets, the adjustment of the angle of the individual brackets may be effected one by one in the path of the movement of said diametrically-expanded portion of the work piece, while the work piece is supported by the remaining brackets. This is shown in FIG. 2 where the arms of one bracket, marked 9, support the main portion of the work piece, while the arms 11 and 11a shown in bracket 9a are spread apart out of contact with said main portion of the work piece in order to permit passage thereabove of said portion 51.

To secure such a spread, all that is required to be done is to impart a rotary movement of the disk 31 by means of said handle 34. Here reference is invited to FIGS. 3 and 4. FIG. 3 shows the arms 11 and 11a in their normal spread for support of a work piece 50. It will be noted that while the arms are in said position, the block 41 mounted on the disk 31 is located to the left of the center of said disk, and that the handle 34 extends radially to the left of the member 28. Now, should the handle be swung in an arc to the diametrically-opposed position shown in FIG. 4, the rotation of the disk effected by means of said handle would bring the block 41 to a new position, namely, to the right of the center of said disk. As the block holds one end of the link 26, and as the link is connected to the fork 20 and by means of said fork to the sleeve 12, said sleeve would be swivelled about the beam 10 in anti-clockwise direction, causing the arm 11 to swing to the left away from the opposed arm 11a from a vertical line x—x passing through the axis of the beam 10. Simultaneously, the opposite arm 11a would be swung in the opposite direction from said line x—x by reason of the rotation of the disk and by reason of the fact that the other link 26a is connected to said other block 41a which is in a diametrical position to said block 41.

After the passage of said portion 51 over and above the arms 11 and 11a, the swing of the handle 34 to its initial position would bring the arms 11 and 11a to their normal position, shown in FIG. 3.

It will be understood that some changes in the structure of the brackets may be made without departing from the inventive concept disclosed herein. So, for instance, the disk 31 may be substituted by a bar fulcrumed, midway its length, upon a stationary support, whereupon each end of the bar would serve for support of a socket-containing member for connection to the lower end of the respective link 26 or 26a.

After having described my improvement, what I wish to claim is as follows:

1. As a part of a fixture adapted to support a work piece for a centerless gringer, in combination a cylindrical beam disposed horizontally, a plurality of brackets mounted thereon, the brackets being alined but spaced from each other, each bracket including two short sleeves mounted co-axially upon said beam in a spaced relation to each other, an arm extending from each sleeve upwardly at an angle to a vertical line passing through the axis of said beam, each sleeve having radial tongue means extending therefrom approximately at right angle to the arm on said sleeve, a stationary member secured to the beam intermediate said sleeves, the member including a body portion below said beam, a member supported by said body portion, said member being adapted to be rotated about a horizontal axis vertically alined with the axis of the beam, a link connecting the tongue means of one sleeve with said rotary member at a point spaced from the axis of its rotation, a second link connecting the tongue means of the other sleeve with said disk at a point diametrically opposed to the first named point, and a handle connected to the rotary member to impart thereto a limited rotary movement to cause both sleeves to be swivelled about the beam to adjust the angle between said arms.

2. In a fixture for centerless grinders, said fixture including a horizontal beam, a bracket for support of a work piece, the bracket including two sleeves mounted on said beam in a spaced relation to each other, an arm extending from each sleeve upwardly, the arms of the two sleeves being in a V-shaped formation with respect to each other and serving as a means for support of said work piece therebetween, each of the sleeves including radially disposed tongue means disposed approximately at right angle to the arm on said sleeve, each of the sleeves being capable of being swivelled about said beam, a stationary member secured to the beam intermediate said sleeves, but including a body portion below said beam, a disk supported by said body portion for rotation about a horizontal axis parallel to the axis of the beam, a link connecting the tongue means of one sleeve with the disk at a point spaced from the center of said disk, a similar link connecting the tongue means of the other sleeve to the disk at a point diametrically opposed to the first-named point, and a handle attached to said disk for rotation thereof.

3. In a fixture for centerless grinders, said fixture including a horizontal beam, a bracket for support of a work piece, the bracket including two sleeves mounted on said beam in a spaced relation to each other, an arm extending from each sleeve upwardly, the arms of the two sleeves being in a V-shaped formation with respect to each other and serving as a means for support of said work piece therebetween, each of the sleeves including radially disposed tongue means disposed approximately at right angle to the arm on said sleeve, each of the sleeves being capable of being swivelled about said beam, a threaded holder pivotally supported by the tongue means of each sleeve, a stationary member secured to the beam intermediate said sleeves, the member including a flat portion disposed at right angle to the axis of the beam, and being provided with a circular aperture therein, a disk fitting into said aperture for a rotary movement about a horizontal axis parallel to the axis of said beam in a vertical alinement thereof, a first link threaded through the holder carried by one sleeve and extending downwardly for connection to a member pivotally mounted on the face of the disk at a point spaced from the center thereof, and a second link similarly connecting the other sleeve to a member pivotally mounted on the disk at a point diametrically spaced from said first named point, and a handle radially attached to said disk for rotation of said disk to swivel simultaneously both sleeves for adjustment of the angle between the work supporting arms.

4. In a fixture for centerless grinders, said fixture including a horizontal beam, a bracket for support of a work piece, the bracket including two sleeves mounted on said beam in a spaced relation to each other, an arm extending from each sleeve upwardly, the arms of the two sleeves being in a V-shaped formation with respect to each other and serving as a means for support of said work piece therebetween, each of the sleeves including radially disposed tongue means disposed approximately at right angle to the arm on said sleeve, each of the sleeves being capable of being swivelled about said beam, a holder supported by said tongue means, the holder being pivoted for a rotary movement in a plane at right angle to the beam, said holder having a threaded bore at right angle to said beam, a stationary member secured to the beam intermediate the sleeves, and including a body portion below said beam, a disk supported by said body portion for rotation about a horizontal axis parallel to the axis of the beam, a socket containing member pivotally mounted on one face of the disk to one side of the center thereof, a second socket containing member mounted on the opposite face of the disk in the opposite direction from the center of said disk, a first link threaded through the holder of one sleeve and fitting at the end remote from said sleeve into the socket one of said sockets containing members and a second link similarly fitting into the socket of the other socket containing member, and a handle attached to said disk for rotation thereof.

5. In a fixture for centerless grinders, said fixture including a horizontal beam, a bracket for support of a work piece, the bracket including two sleeves mounted on said beam in a spaced relation to each other, an arm extending from each sleeve upwardly, the arms of the two sleeves being in a V-shaped formation with respect to each other and serving as a means for support of said work piece therebetween, each of the sleeves being split transversely to form two opposed ends and being adapted to be rotated about the beam, a tongue extending radially from each end of the sleeve, the tongues being in a substantially parallel relation to each other, a fork held between said tongues, a holder mounted within the fork for rotation about an axis parallel to said beam, the holder having a threaded bore at right angle to the beam, a stationary member secured to the beam intermediate the sleeves and including a body portion below said beam, a disk supported by said body portion for rotation about a horizontal axis parallel to the axis of the beam, a socket-containing member pivotally mounted on one face of the disk to one side of the center thereof, a second socket-containing member mounted on the opposite face of the disk in the opposite direction from the center of said disk, a first link threaded through the holder of one sleeve and fitting at the end remote from said sleeve into the socket of one of said socket-containing members, and a second link similarly fitting into the socket of the other socket-containing member, and a handle attached to said disk for rotation thereof.

6. In a fixture for centerless grinders, said fixture including a horizontal beam, a bracket for support of a work piece, the bracket including two sleeves mounted on said beam in a spaced relation to each other, an arm extending from each sleeve upwardly, the arms of the two sleeves being in a V-shaped formation with respect to each other and serving as a means for support of said work piece therebetween, each of the sleeves including radial tongue means extending substantially at right angle to the arm thereon, a stationary support secured to the beam intermediate said sleeves, a rotary member pivotally mounted upon said support for a limited rotary movement in a plane at right angle to said beam, a handle secured to said member and serving to hold said member against rotation, a link at one end pivotally connected to said member at a point spaced from its pivotal connection, the link being threaded at the other end through intermediate means secured to said tongue means of one sleeve, a second link similarly connecting the other sleeve with said rotary member, each link being adapted to be turned about its axis to impart a rotary movement to the respective sleeve to adjust the position of the arm with respect to the other arm, said rotary member being adapted to be turned about its pivotal connection by said handle to actuate said links whereby both arms of the bracket may be simultaneously spread apart from each other or brought towards each other.

References Cited in the file of this patent

UNITED STATES PATENTS 2,775,077    Wittenberg  ------------ Dec. 25, 1956

FOREIGN PATENTS 123,680    Germany  ------------ Sept. 19, 1901